(12) United States Patent
Nyberg et al.

(10) Patent No.: US 7,873,362 B2
(45) Date of Patent: Jan. 18, 2011

(54) METHOD FOR DIMENSIONING OR EVALUATING A RADIO NETWORK

(75) Inventors: Henrik Nyberg, Stockholm (SE); Per Magnus Lundevall, Sollentuna (SE); Birgitta Olin, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 768 days.

(21) Appl. No.: 11/575,784

(22) PCT Filed: Dec. 22, 2004

(86) PCT No.: PCT/SE2004/001974

§ 371 (c)(1),
(2), (4) Date: Mar. 22, 2007

(87) PCT Pub. No.: WO2006/033603

PCT Pub. Date: Mar. 30, 2006

(65) Prior Publication Data

US 2008/0254748 A1    Oct. 16, 2008

(30) Foreign Application Priority Data

Sep. 24, 2004   (SE) .................................. 0402353

(51) Int. Cl.
*H04W 40/00* (2009.01)
(52) U.S. Cl. .................... 455/446; 455/422.1; 455/443; 455/444; 455/445; 455/449; 370/320; 370/322; 370/310.2; 370/328; 370/338
(58) Field of Classification Search ................. 455/405, 455/418–420, 423, 428, 560, 522, 436–453, 455/457.1, 67.11, 115.1, 456.1, 226.1; 370/320, 370/322, 310.2, 328–338
See application file for complete search history.

(56) References Cited

U.S. PATENT DOCUMENTS

| 6,212,668 B1 * | 4/2001 | Tse et al. ........................ 716/7 |
| 6,278,701 B1 * | 8/2001 | Ayyagari et al. ............. 370/335 |
| 6,459,901 B1 * | 10/2002 | Chawla et al. ............... 455/450 |
| 6,519,705 B1 | 2/2003 | Leung |
| 6,889,033 B2 * | 5/2005 | Bongfeldt ................... 455/11.1 |

FOREIGN PATENT DOCUMENTS

| EP | 1098546 A2 | 5/2001 |
| WO | WO 2004/025980 A1 | 3/2004 |
| WO | WO 2004/056146 A2 | 7/2004 |

* cited by examiner

*Primary Examiner*—Kent Chang
*Assistant Examiner*—San Htun
(74) *Attorney, Agent, or Firm*—Roger S. Burleigh

(57) ABSTRACT

A simple and reliable method for dimensioning CDMA based networks is achieved by a method for evaluating or dimensioning a radio network comprising the steps of—defining a radio network model comprising at least one radio base station and a plurality of mobile terminals, —for each mobile terminal in the model, defining a path gain value for a signal path between the mobile terminal and each of the radio base stations, said method being characterized by the steps of—for each mobile terminal, selecting at least one of said path gain values, —defining a data set comprising at least one parameter based on said selected at least one path gain value for each mobile terminal, and—performing dimensioning calculations on the data set. Especially if data sets are prestored the dimensioning calculations can be carried out in very short time.

10 Claims, 4 Drawing Sheets

METHOD FOR DIMENSIONING OR EVALUATING A RADIO NETWORK

FIELD OF THE INVENTION

The present invention relates to a method for evaluating or dimensioning a radio network.

BACKGROUND OF THE INVENTION

The purpose of radio network dimensioning is to estimate the required number of radio base stations needed to support a specified traffic load in an area. The outcome of the dimensioning procedure is used in radio network design processes to get an early indication of network size and cost. The dimensioning phase is later followed by a planning phase during which more specific information is collected, enabling a more detailed analysis. Similar procedures may be used, for example, to determine the performance of a network having a given distribution of base stations.

The dimensioning process generally starts with an assumed network model. FIG. 1 shows such an assumed model. A number of hexagonal adjacent cells 1 each comprising a base station 3 are assumed. Further, within the area covered by the cells 1 a number of mobile terminals 5 are assumed. The assumed distribution of the mobile terminals may be arbitrary. Typically, a uniform distribution is selected. Thus, some terminals will be located close to a base station, others farther away. Some terminals will be located on the border between two cells.

The model typically comprises at least 30 cells and several thousand terminals. To obtain complete data for the network the path gain between each mobile terminal and each base station is determined. These path gain values are typically stored in a path gain matrix having one column for each cell and one row for each terminal. In the prior art three main methods for network dimensioning are known. The most accurate method involves simulating the behaviour in the network. This involves calculating the path gain matrix a large number of times. Typically, the simulations should cover a time span of several thousand seconds and the time between the calculations should not exceed 1 ms. Thus, in this method the path gain matrix must be calculated several million times. This provides detailed information but is very time consuming. With current computing resources one such simulation takes several hours. Therefore, this method is not practical for network dimensioning involving trial and error.

Simpler WCDMA dimensioning methods are known, which use calculations that utilize expressions aimed at determining power levels, e.g. the average power, for both capacity and coverage estimates corresponding to a fixed number of users in each cell. These average values are assumed to be constant throughout the calculations. Margins are added to compensate for traffic variations and randomness of the radio environment, e.g. shadow fading. In these methods, the values of the path gain matrix are condensed to a number of parameters that are used as input values for the calculation. Therefore, this method is faster than the simulation methods outlined above, but are less accurate. If the model is changed, the parameters should be calculated again, which is cumbersome. Therefore, the method is also not very flexible.

A more refined approach is the snapshot based simulation technique, which mainly targets network planning. In the snapshot approach, a number of independent samples of the network state are generated using assumed steady-state distributions for traffic and radio links. Appropriate performance statistics is collected in order to draw conclusions about coverage and capacity given the current network layout. The static snapshot simulations are sometimes complemented by short dynamic simulations in order to better take certain dynamic mechanisms into account. Full dynamic simulations are usually considered too cumbersome for dimensioning and planning since the search for suitable cell sizes might require a large number of time consuming simulations with different network configurations.

SUMMARY OF THE INVENTION

The present invention intends to solve the problem of achieving a simple and reliable method for dimensioning of wireless communication networks, in particular CDMA based networks.

This is achieved according to the invention by a method for evaluating or dimensioning a radio network comprising the steps of
- defining a radio network model comprising at least one radio base station and a plurality of mobile terminals,
- for each mobile terminal in the model, defining a path gain value for a signal path between the mobile terminal and each of the radio base stations, said method being characterized by the steps of
- for each mobile terminal, selecting at least one of said path gain values,
- defining at least one data set comprising at least one parameter based on said selected at least one path gain value for each mobile terminal, and
- performing dimensioning calculations on the at least one data set.

According to the invention the amount of data that needs to be considered is significantly reduced while maintaining information relating to each individual mobile terminal.

Therefore a reliable result is obtained in very short calculation times, below 1 second.

The inventive method may be used for dimensioning as discussed above, but it may also be used for other types of evaluations related to the performance of a network. For example, the amount of traffic that can be supported by a given network can be calculated.

The inventive method is suitable for use in CDMA based networks, such as WCDMA and CDMA 2000. It can also be used in OFDM based systems, with modifications that will be within the capability of the skilled person.

In a preferred embodiment the at least one data set comprises, for each mobile terminal, the n highest path gain value of the path gain values for that mobile terminal, n being a positive integer, preferably 1, 2 or 3.

If n=2, that is, the highest and second highest path gain value for each mobile terminal is considered, the case of soft handover can also be covered by the inventive method.

Using n=3 further improves the accuracy.

The at least one data set preferably also comprises, for each mobile terminal, a sum of the remaining path gain values of the path gain values for that mobile terminal.

The selected values may relate to the instantaneous and/or average downlink path gain, the instantaneous and/or average uplink path gain, or both, depending on the information wanted and the type of network.

In a preferred embodiment the at least one data set includes the instantaneous and/or average non-orthogonality factors for the signal paths corresponding to the n highest path gain values of the path gain values for that mobile terminal.

To make the step of performing dimensioning calculations more efficient, a number of radio network models and the corresponding data set for each radio network model can be defined in advance. In this case, the steps of determining the path gain values and selecting the data set can be replaced by selecting the desired radio network model and retrieving the corresponding data set.

In this case, the method comprises two main parts:

The first part relates to a method for evaluating or dimensioning a radio network, comprising the steps of
 defining a plurality of radio network models, each comprising at least one radio base station and a plurality of mobile terminals, and for each model performing the following steps:
  for each mobile terminal in the model, defining a path gain value for a signal path between the mobile terminal and each of the radio base stations,
  for each mobile terminal, selecting at least one of said path gain values, and
  defining at least one data set comprising at least one parameter based on said selected at least one path gain value for each mobile terminal, and storing said at least one data set.

The second part relates to a method for evaluating or dimensioning a radio network, comprising the steps of selecting a radio network model among a number of predefined radio network models, each radio network model comprising at least one radio base station and a plurality of mobile terminals, and having, for each mobile terminal in the model, a defined path gain value for a signal path between the mobile terminal and each of the radio base stations, selecting among a number of prestored data sets a first data set corresponding to said selected radio network model, and performing dimensioning calculations on the at least one data set.

Using predefined data sets, the calculations can be performed using a very simple calculating program, for example a spreadsheet such as Excel, adapted to perform the desired calculations.

Alternatively, the step of defining a path gain matrix includes calculating path gain values based on a model.

The object is also achieved by a computer program product comprising computer readable code which, when run in a computer causes the computer to perform the method according to any one of the claims 1-11.

The method is derived to handle real-time services on dedicated channels but can easily be augmented to include best-effort traffic on the high-speed downlink shared channel. The method facilitates the calculation of transmit power distribution based on detailed link gain statistics, which enables a fast yet accurate estimation of, e.g., the network design and cost.

The method according to the present invention covers and integrates several aspects of downlink and uplink coverage and capacity. The method differs from the standard dimensioning approach in the fundamental aspect that simultaneous distributions of user positions, traffic intensities and inter-cell interference are included explicitly throughout the calculations. In this, shadow and multipath fading are also taken into account. Additional refinements can be made in order to take antenna diversity, soft handover (HO) and softer HO into account. Instead of obtaining approximate average power levels, we thus get comparatively accurate estimates of distributions for the different quantities that are important for dimensioning purposes. Since the power distributions, in particular the tails, provide valuable information about the system, the proposed method will yield a better understanding of the system and its ability to serve the offered traffic than methods based on averages. For instance, a distribution for the cell carrier transmit (TX) power can be used to determine how often the network suffers from base station power outage.

DESCRIPTION OF THE INVENTION

Figure 1:
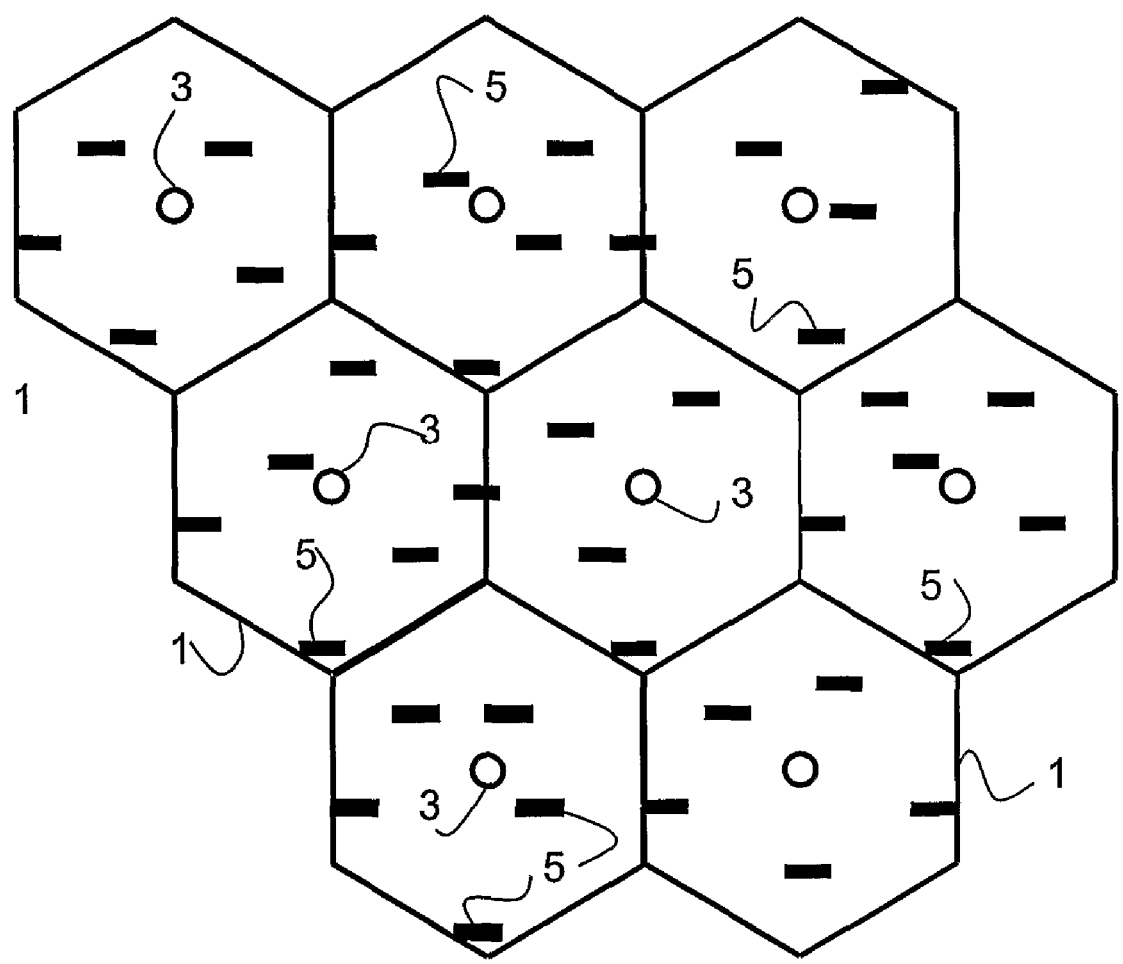
FIG. 1 illustrates a network model commonly used in network dimensioning.

Next, the models and assumptions that will be used within the scope of the present invention are explained. The basic quantity for dimensioning is the instantaneous link quality, that is the received carrier to interference (plus noise) ratio (C/I). The downlink (DL) or uplink (UL) C/I, denoted by $\gamma_b(x)$ for a link between an arbitrary position x and a cell b, is given by $$\gamma_b(x) = p_b(x) \cdot g_b(x)/(I_b(x)+N) \qquad (1)$$

where $p_b(x)$ is the (instantaneous) transmit power assigned to the link, $g_b(x)$ is the corresponding link gain, $I_b(x)$ is the received interference and N is thermal noise. Equation (1) is valid for both the uplink and the downlink, but the interference term depends on the direction (the noise level might as well). The interference for the uplink is $$I_b(x) = \sum_{x' \neq x} p_b(x') \cdot g_b(x') \qquad (2)$$

where the summation goes over all other present user positions. For the downlink, the interference is $$I_b(x) = P_{cell,b} \cdot \alpha_b(x) \cdot g_b(x) + \sum_{b' \neq b} P_{cell,b'} \cdot g_{b'}(x) \qquad (3)$$

where $P_{cell,b}$ is the carrier TX power in cell b and where the sum goes over all cells $b' \neq b$. The factor $\alpha_b(x)$ is the "non-orthogonality" factor, modelling the impact of intra-cell interference due to loss of orthogonality to the other cell b links. The total cell power is given by $$P_{cell,b} = P_{CCH,b} + \sum_x p_b(x) + P_{HS\text{-}DSCH,b} \qquad (4)$$

in which $P_{CCH,b}$ is the power assigned to the common control channels (CCH) in cell b and $P_{HS\text{-}DSCH,b}$ is the power assigned to the HS downlink shared channel. Without HSDPA, the last term in (4) is zero.

The gain $g_b(x)$ comprises antenna gain, propagation loss, shadow fading and multipath fading. It depends on the distance and angle between position x and cell b, and random factors associated with shadow and multipath fading.

The notation $\bar{g}_b(x)$ is used for the link gain without multipath fading ("average gain"). In the following, cell numbering is done individually for each position x with respect to the ranking of the average link gains, i.e.

$$\bar{g}_1(x) \leq \bar{g}_2(x) \leq \bar{g}_3(x) \geq \ldots \quad (5)$$

Thus for position x, the cell with the highest average link gain is denoted by 1, the second highest by 2, etc.

For dedicated channels (DCH), it is assumed that for each service s, a required C/I level $\gamma(s)$ can be specified. Fast power control assigns transmit power to the active links (between the user equipment (UE) and various cells) in order to satisfy the C/I requirement if possible (power limitations might apply). For HS-DSCH, the transmit power is fixed. The achieved link quality is then given by equation (1).

For each position x, power is assigned to the link with the highest average gain $\bar{g}_1(x)$. In case of soft HO, power is assigned to the n links (n different cells) with the n highest average link gains. In the following, soft HO with at most two links (i.e. $n \leq 2$) is assumed. The assumed HO rule is that a UE has active links to the two best cells if $$\bar{g}_2(x)/\bar{g}_1(x) \geq T \quad (6)$$

for some HO threshold T.

The power assigned to the CCHs is assumed to be proportional to the common pilot channel (CPICH) power.

In addition, some standard assumptions are used for the radio environment and the traffic distribution. That is, a homogenous radio environment is assumed. Parameters associated with propagation loss, shadow fading and multipath fading are the same for all cells. User positions are mutually independent and uniformly distributed over the area considered. The number of users in the area of each service is assumed to be Poisson distributed (blocking and other user access restrictions are not regarded). The network is built up by sites in a uniform hexagonal pattern, i.e. equally sized cells.

A first approach of the present invention refers to a WCDMA-system without high speed downlink shared channel (HS-DSCH).

Figure 2:
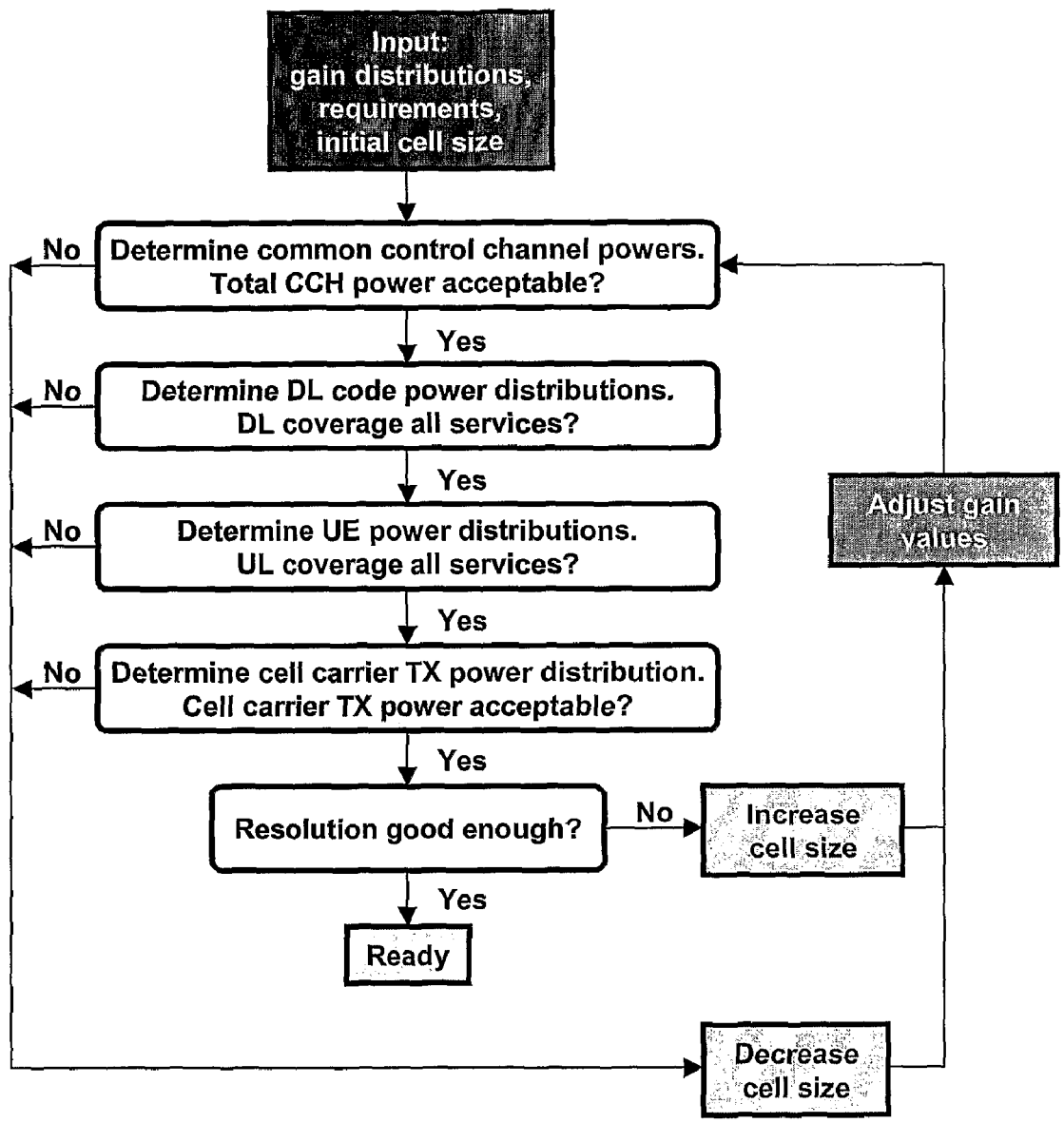
FIG. 2 illustrates a flow chart of a basic dimensioning loop.

The proposed dimensioning procedure uses an iterative loop in its search for an appropriate network cell size. This is illustrated in FIG. 2. The overall loop disclosed in FIG. 2 corresponds essentially to the method used in the prior art, however, the way each step is performed according to the invention differs. Below, first an overall description of the method of FIG. 2 is given, then each step will be discussed in detail.

Before the loop is entered, in step 1 the cell size is set to an initial value. The gain distributions assumed and any other requirements are given as input data. Given the cell size, a number of performance related parameters are then checked using the input data from step 1. In step 2 the coverage with respect to CCHs is checked. This involves determining the common control channel powers and determining if the total CCH power is acceptable. If the answer is yes the method proceeds to step 3.

In step 3, the downlink code power distribution is checked. If there is sufficient downlink coverage for all services, the method proceeds to step 4.

In step 4 the power distribution of the mobile terminal is checked. If there is sufficient uplink coverage for all services, the method proceeds to step 5.

In step 5, the total cell output power is estimated and checked. If this is also acceptable the resolution is checked, in step 6. If this is found to be good enough, the dimensioning process is finished.

If the result in any of the steps 2-5 is not satisfactory, the cell size should be decreased, in step 8. If the results from steps 2-5 are satisfactory but the resolution determined in step 6 is not good enough, the cell size should be increased, which is done in step 7. After increasing or decreasing the cell size, the gain values are adjusted accordingly, in step 9, and the loop commences again with step 2 to perform calculations on the new cell size. The cell size is altered until a sufficiently good solution is found.

In the following, steps 1-5 will be discussed in more detail, starting with step 1. In order to estimate the power distributions some input data must be prepared. First, a large number of user positions are sampled randomly in an area with a specified radio environment. The area is then covered by cells, as illustrated in FIG. 1, and for all selected positions, path gain values associated with all cells in the area are derived. The reason for studying a large number of randomly chosen positions instead of working directly with the gain distribution is the complex nature of the gain values and their mutual dependencies. No resampling will be necessary when changing cell sizes, as long as the gain has a form that can be rescaled and the user equipments are uniformly distributed over the area.

At most two soft HO links are considered here. The data necessary for each sampled position x will then be $g_1(x)$ and $g_2(x)$ (corresponding to the ordered average gains $\bar{g}_1(x)$ and $\bar{g}_2(x)$), and the corresponding sums of the link gains to the lower ranked cells, i.e.

$$g_{sum,1}(x) = \sum_{b \geq 2} g_b(x) \text{ and } g_{sum,2}(x) = \sum_{b \geq 3} g_b(x).$$

In addition, the corresponding average gains $\bar{g}_1(x)$, $\bar{g}_2(x)$, $\bar{g}_{sum,1}(x)$ and $\bar{g}_{sum,2}(x)$ are needed.

Step 2: When assigning TX power to the downlink common control channels, the power required for the common pilot channel (CPICH) is determined first. Then, the power levels of the other common control channels are set based on knowledge about their relative required strength compared to the CPICH.

The required CPICH power for position x, corresponding to the $E_c/N_o$ requirement $\gamma_{CPICH}$, is estimated by $$P_{CPICH}(x) = \gamma_{CPICH} \cdot \left( \hat{P} \cdot \left(1 + \frac{\bar{g}_{sum,1}(x)}{\bar{g}_1(x)}\right) + \frac{N_{DL}}{\bar{g}_1(x)} \right) \quad (7)$$

where $\hat{P}$ is the expected peak cell output power and $N_{DL}$ is the downlink thermal noise. The average CCH power needed for coverage of x is obtained by $$p_{CCH}(x) = P_{CPICH}(x) \cdot F_{mean} \quad (8)$$

where $F_{mean}$ is a factor comprising the C/I requirements and expected activity factors of the common control channels. The actual average CCH power $\bar{P}_{CCH}$ is estimated as the CCH power yielding coverage of a sufficiently high percentage of the samples. The level of the CCH power is acceptable if the actual average CCH power is below a given threshold.

Step 3: Downlink coverage is investigated by examining the code power distribution, that is the distribution of the power assigned to DCHs in the downlink direction. Given the estimated gain value distributions described by the input data, the code power distributions for different services are obtained as the output powers that yield required C/I values.

Step 4: The code power distribution is estimated using equations (1), (3), an averaged version of (4) and the gain samples. An iterative scheme is used with an initial guess of the average cell TX power. For users not in HO, the code power corresponding to position x and service s, $p_1(x,s)$, is estimated by $$p_1(x,s) = \gamma_{DL}(s) \cdot \tilde{I}_1(x) \quad (9)$$

in which $\gamma_{DL}(s)$ is the target C/I for service s and $\tilde{I}_1(x)$ is the interference plus noise divided by the strongest gain value. Applying equation (3) for the strongest cell, the scaled interference can be written as $$\tilde{I}_1(x) = P_{cell,1} \cdot \alpha_1(x) + \overline{P}_{cell} \cdot \frac{g_{sum,1}(x)}{g_1(x)} + \frac{N_{DL}}{g_1(x)} \quad (10)$$

where the cell output power levels in all other cells are approximated by the mean cell power $\overline{P}_{cell}$. The output power of the selected cell, $P_{cell,1}$, is in this stage approximated by the mean cell power as well. In the first step of the iteration, a suitable initial guess of $\overline{P}_{cell}$ is used.

For samples in HO positions, it is assumed that the total C/I is the sum of the C/I values on the links in the active set. Assuming equal output powers on both links, the code power for a sample in HO is $$p_1(x,s) = p_2(x,s) = \frac{\gamma_{DL}(s)}{1 + \tilde{I}_1(x)/\tilde{I}_2(x)} \cdot \tilde{I}_1(x) \quad (11)$$

where $\tilde{I}_1(x)$ is given by (10) and $\tilde{I}_2(x)$ is the scaled interference on the second strongest link, i.e.

$$\tilde{I}_2(x) = P_{cell,2} \cdot \alpha_2(x) + \frac{P_{cell,1} \cdot g_1(x) + \overline{P}_{cell} \cdot g_{sum,2}(x)}{g_2(x)} + \frac{N_{DL}}{g_2(x)} \quad (12)$$

The approximation $P_{cell,1} = P_{cell,2} = \overline{P}_{cell}$ is used in (12) to simplify numerical calculations. Finally, the code powers are adjusted with respect to the code power limits $p_{max}(s)$, i.e.

$$p(x,s) = \min(p_1(x,s), p_{max}(s)) \quad (13)$$

Once the code power samples have been calculated, the average cell output power is updated according to $$\overline{P}_{cell} = \overline{P}_{CCH} + \sum_s (\overline{p}(s) + \overline{p}_H(s) \cdot F_H) \cdot n(s) \cdot d(s) \quad (14)$$

in which the sum goes over the services s that are present, $\overline{p}(s)$ is the mean code power (over all samples x) and $\overline{p}_H(s)$ is the mean power for the samples in HO for service s, n(s) is the mean number of service s users per cell (given by cell size, user density and relative service mix), $F_H$ is the fraction of samples in HO and d(s) is the activity (or DTX) factor. The code power estimation is iterated until the average cell power stabilizes. The code power distribution for service s is then estimated by the empirical distribution of the calculated code power samples, i.e.

$$F_s(y) = M_s(y)/M \quad (15)$$

where $M_s(y)$ is the number of samples with a power p(x,s) less than or equal to y, and M is the total number of samples. Coverage is checked for each service s by the condition that at most a fraction $f_s$ of the users exceed a specified level $P_{lim,s}$:

$$F_s(p_{lim,s}) \geq 1 - f_s \quad (16)$$

Uplink coverage is checked by examining the UE power distribution. This distribution is obtained in the same way as the code power distribution. In the uplink the C/I equation (1) is combined with the uplink interference given by (2) and the target C/I for service s, $\gamma_{UL}(s)$. Receiver antenna diversity is taken into account by modelling the combined C/I as a function of the C/I values for the antenna branches. The uplink coverage is checked by a condition similar to equation (16).

Step 5: The downlink code power calculations are only valid if the cells do not suffer from power shortage. Hence, the cell carrier TX power distribution, which is the distribution of the sum of the powers assigned to the dedicated channels and the common control channels, must be included in the process. To obtain the cell TX carrier power distribution, code power distributions are convolved and then shifted according to the common control channel setting. To produce an estimate that accurately mimics the cell power distribution, we include the effects of macro diversity, TX increase and the effects of traffic variations. In the following, we consider the single-service case. The extension to multiple services is straightforward.

The carrier power, $P_{cell}$, is given by equation (4). The corresponding carrier power distribution function is then given by $$P(P_{cell} \leq y) = \sum_{n_H=0}^{\infty} \sum_{n_{NH}=0}^{\infty} F_{n_H,n_{NH}}(y) \cdot w(n_H, n_{NH}) \quad (17)$$

where $F_{n_H,n_{NH}}(Y)$ is the carrier power distribution function given $n_H$ users in HO and $n_{NH}$ not in HO, and where the weight $w(n_H, n_{NH})$ is the probability of such a combination. The total number of users in a cell is assumed to be Poisson distributed. Since HO is assumed to depend on the gains only, the number of users not in HO respectively in HO are independent and Poisson distributed, i.e.

$$w(n_H, n_{NH}) = \frac{m_H^{n_H}}{n_H!} e^{-m_H} \cdot \frac{m_{NH}^{n_{NH}}}{n_{NH}!} e^{-m_{NH}} \quad (18)$$

where $m_H$ and $m_{NH}$ are the expected numbers of users in HO respectively not in HO. These quantities are given by the (current) cell size, user density and $F_H$, i.e. the estimated fraction of users in HO. The carrier power density (corresponding to $F_{n_H,n_{NH}}(y)$) given $n_H$ and $n_{NH}$ users, is calculated as the density of the sum of $n_H + n_{NH}$ stochastically independent code powers plus a fixed CCH power, i.e.

$$f_{n_H,n_{NH}}(y) = f_H^{*n_H} * f_{NH}^{*n_{NH}}(y - P_{CCH}) \quad (19)$$

where $f_H$ and $f_{NH}$ are the conditional code power densities (note that they depend on $n_H$ and $n_{NH}$) and where $f^{*n}$ means the n-fold convolution of the function f by itself ($f^{*0}$ is Dirac's delta). The code powers are given by equation (9) and (11), so the code power distributions (and consequently corresponding densities) can be estimated as in the preceding section by equation (15). The difference now is that the average carrier power in the strongest cell ($P_{cell,1}$ in (10) and (12)) is estimated using equation (14) but with the given values of $n_H$ and $n_{NH}$ rather than the average numbers. For the other cells, the overall average carrier power according to equation (14) is used. Thus, new code power densities must be estimated for each combination of $n_H$ and $n_{NH}$. To limit the computational effort, a subset of "interesting" ($n_H$, $n_{NH}$) combinations is chosen for the summation in equation (17). A useful method is to apply a random sampling scheme over a large subset of combinations.

Note that the carrier power distribution is calculated as if the code powers are independent when the number of users is given. In fact, this is an approximation but it usually works well since the code power variance is normally dominated by stochastic link gains that are uncorrelated between different users.

Power shortage is checked by the condition that $$P(P_{cell} \leq P_{cell,max}) \geq 1-q \qquad (20)$$

where $P_{cell,max}$ is the maximal cell power and q is a specified power outage risk.

The method proposed above can be extended to include best effort data on the HS-DSCH. The power available for the HS-DSCH is given by the cell carrier power consumption needed to handle the services on DCHs and the common control channels. Via C/I calculations for the different positions, it is possible to derive a bitrate distribution that can be used when estimating HS-DSCH coverage and throughput. The method makes it possible to use detailed HS-DSCH link modelling including variable multipath fading. The focus is to estimate the bitrate experienced by the user being served, which is a relevant measure for coverage checking. This measure corresponds to the potential cell HS-DSCH throughput when round-robin scheduling is applied.

The HS-DSCH and DCHs share the power not assigned to the CCHs, but DCHs have priority over the HS-DSCH. The bitrate per mobile terminal position sample is estimated to obtain the bitrate distribution. Equations (1) and (3) are used to calculate C/I samples which in turn are used to estimate the bitrate samples that yield the estimated bitrate distribution. For equations (1) and (3), the power assigned to the HS-DSCH must be specified.

Adaptive coding and modulation can be taken into account by sampling several gain samples per link in order to capture the multipath fading variation. For each sampled UE position, a number of gain value samples are generated with different but correlated multipath fading components (correlation depending on UE speed). The corresponding C/I values are used to get instantaneous bitrate samples (corresponding to coding, modulation and BLER) that are averaged for each UE. The HS-DSCH bitrate distribution is estimated from the UE bitrate samples obtained in the bitrate estimation step. Coverage is checked by the condition that the UE bitrate is at least at a specified level with a sufficiently high probability.

Figure 3A:
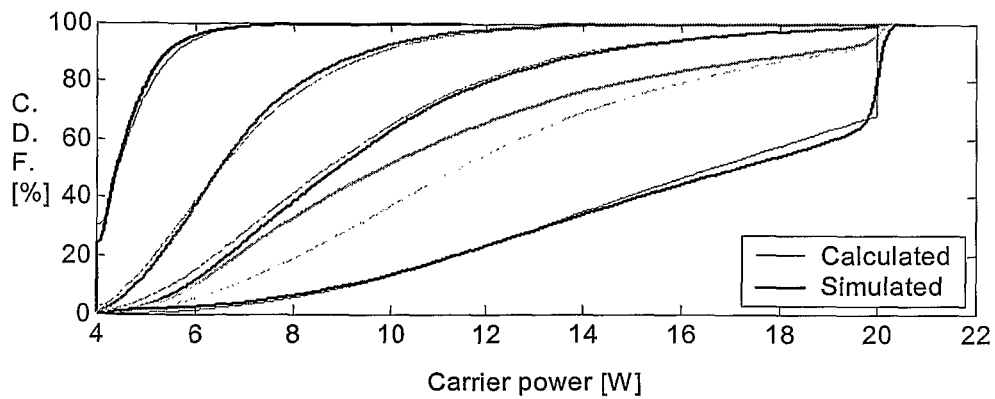
FIG. 3a shows a carrier power distribution and FIG. 3b shows a diagram of the blocking/dropping rates.
Figure 3B:
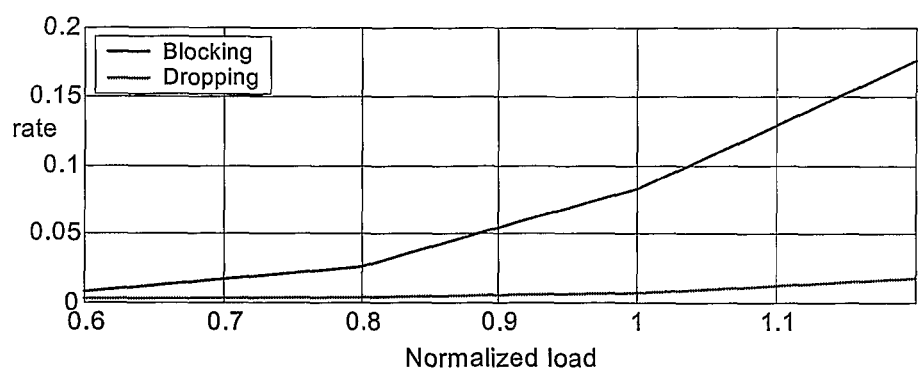

We have compared calculated power distributions and dimensioning results with those derived from detailed dynamic system simulations for three different cases. In the first example we wanted to estimate the maximal conversational video traffic load that a given network can handle. The offered load is normalized with the load that yields a total dropping and blocking rate of 10%. In this example it was the cell carrier power that was the limiting factor rather than insufficient coverage. The maximal normalized load was determined to 0.82 by the dimensioning loop. For loads higher than that, the risk of power outage was too high. In FIG. 3a, calculated cell carrier TX power distributions (dashed lines) are compared with distributions derived from dynamic system simulations (solid lines) for different load levels. Admission and dropping functions were disabled in the dynamic simulations. In general, there is a good fit between the calculated and simulated distributions, particularly between the tails holding important information about the system quality. When the admission and dropping functions are disabled the video quality deteriorates rapidly when the cell runs out of TX power. Activating admission and dropping functions prevents this. FIG. 3b shows dropping and blocking rates extracted from system simulations (with admission and dropping functions activated). The simulations indicated a normalized capacity in the range 0.8-0.9, depending on accepted blocking and dropping probabilities. The carrier power limit was assumed to be 20 W.

Figure 4A:
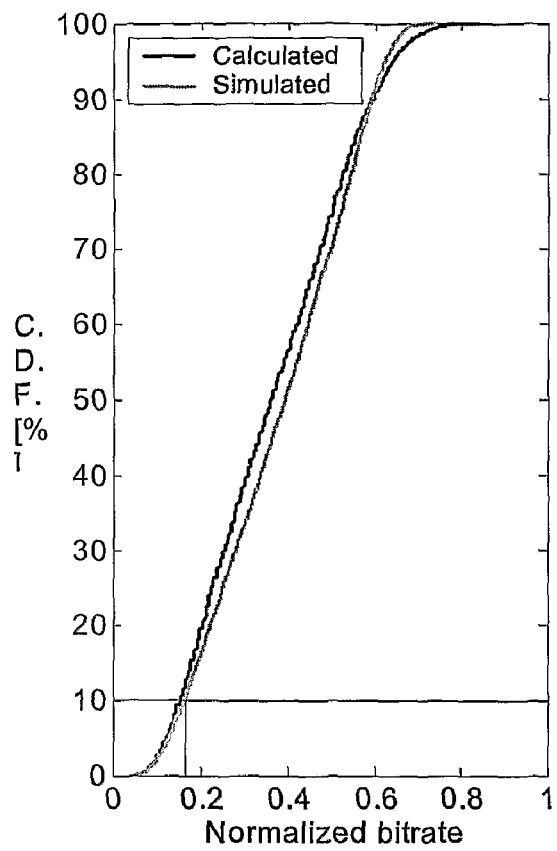
FIGS. 4a and 4b show a diagram of the normalised bitrate, whereof FIG. 4a relates to a scenario of mixed best-effort and voice and FIG. 4b relates to best-effort scenario only.
Figure 4B:
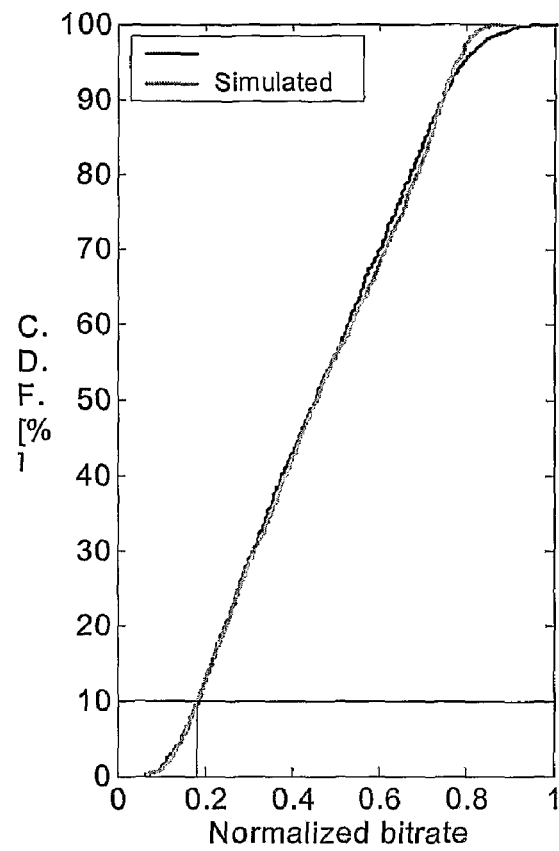

The second and third examples include best-effort services mapped onto the HS-DSCH. The second example determines a network deployment that can provide the required quality for a specified user density and traffic load per user. The required quality is specified by maximal frame error rate for the speech service and good enough bitrate coverage for the best-effort service. FIG. 4a depicts normalized bitrate distributions that are derived from calculations and system simulations for the cell size determined by the dimensioning loop. As can be seen, the system simulations verify that the requirement to cover 90% of the area with a normalized bitrate of at least 0.16 is fulfilled. Moreover, the bitrate distribution derived from the calculations show good resemblance with that extracted from system simulations. Finally, for the same area and the same network, the normalized bitrate distributions for a heavily loaded pure best-effort HSDPA scenario were derived. These are shown in FIG. 4b. In this case the bitrate distribution corresponds to that of round-robin scheduling and the mean bitrate indicates the expected system throughput.

As mentioned above, although the inventive method has been disclosed primarily for a WCDMA network it can be used in other CDMA based networks such as CDMA 2000. It can also be used in OFDM based systems, with modifications that will be within the capability of the skilled person.

The individual steps of FIG. 2 can also be useful in other types of dimensioning and evaluation processes than the dimensioning problem illustrated in FIG. 2. For example, it may be useful when determining the amount of traffic that can be supported in a particular network.

The invention claimed is:

1. A method implemented by a computer for evaluating or dimensioning a radio network, comprising the steps of:
defining mathematically a radio network model comprising at least one radio base station and a plurality of mobile terminals;
for each mobile terminal in the model, defining a path gain value for a signal path between the mobile terminal and each of the radio base stations;
for each mobile terminal, selecting at least one of said path gain values;
defining at least one data set comprising at least one parameter based on said selected at least one path gain value for each mobile terminal; and,
performing dimensioning calculations on the at least one data set, comprising the steps of:
initializing a cell size;
determining common control channel powers and determining if a total common control channel power is acceptable;
determining downlink code power distributions and determining if there is sufficient downlink coverage for all services;

determining mobile terminal power distributions and determining if there is sufficient uplink coverage for all services;

determining total cell output power;

if all of the determining steps are acceptable then checking if resolution is acceptable and if yes then finish and if not increasing the cell size and adjusting the path gain values and repeat the determining steps; and, if anyone of the determining steps are not acceptable then decreasing the cell size and adjusting the path gain values and repeat the determining steps until a sufficiently good cell size is found.

2. A method according to claim 1, wherein the at least one data set comprises, for each mobile terminal, the n highest path gain values of the path gain values for that mobile terminal, n being a positive integer.

3. A method according to claim 2, wherein the at least one data set comprises, for each mobile terminal, a sum of the remaining path gain values of the path gain values for that mobile terminal.

4. A method according to claim 2, wherein n=1.

5. A method according to claim 3, wherein n=2.

6. A method according to claim 1, wherein the selected values relate to the instantaneous and/or average downlink path gain.

7. A method according to claim 1, wherein the selected values relate to the instantaneous and/or average uplink path gain.

8. A method according to claim 1, wherein the at least one data set includes the instantaneous and/or average non-orthogonality factor for the signal path corresponding to the n highest path gain values of the path gain values for that mobile terminal.

9. A method according to claim 1, wherein the step of defining a path gain matrix includes calculating path gain values based on the radio network model.

10. A method implemented by a computer for evaluating or dimensioning a radio network, comprising the steps of selecting a radio network model among a number of predefined radio network models, each radio network model comprising at least one radio base station and a plurality of mobile terminals, and having, for each mobile terminal in the model, a defined path gain value for a signal path between the mobile terminal and each of the radio base stations;

selecting among a number of prestored data sets a first data set corresponding to said selected radio network model; and, performing dimensioning calculations on the at least one data set, comprising the steps of:

initializing a cell size;

determining common control channel powers and determining if a total common control channel power is acceptable;

determining downlink code power distributions and determining if there is sufficient downlink coverage for all services;

determining mobile terminal power distributions and determining if there is sufficient uplink coverage for all services;

determining total cell output power;

if all of the determining steps are acceptable then checking if resolution is acceptable and if yes then finish and if not increasing the cell size and adjusting the path gain values and repeat the determining steps; and, if anyone of the determining steps are not acceptable then decreasing the cell size and adjusting the path gain values and repeat the determining steps until a sufficiently good cell size is found.

* * * * *

UNITED STATES PATENT AND TRADEMARK OFFICE
CERTIFICATE OF CORRECTION

| | |
|---|---|
| PATENT NO. | : 7,873,362 B2 |
| APPLICATION NO. | : 11/575784 |
| DATED | : January 18, 2011 |
| INVENTOR(S) | : Nyberg et al. |

Page 1 of 1

It is certified that error appears in the above-identified patent and that said Letters Patent is hereby corrected as shown below:

In Fig. 4b, Sheet 4 of 4, delete " 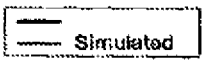 " and insert --  --, therefor.

In Column 5, Line 5, in Equation (5), delete " $\overline{g}_1(x) \leq \overline{g}_2(x) \leq \overline{g}_3(x) \geq \cdots$ " and insert -- $\overline{g}_1(x) \geq \overline{g}_2(x) \geq \overline{g}_3(x) \geq \cdots$ --, therefor.

In Column 7, Line 47, in Equation (13), delete " $p(x,s) = \min(p_\lambda(x,s), p_{max}(s))$ " and insert -- $p(x,s) = \min(p_\lambda(x,s), p_{max}(s))$ --, therefor.

In Column 8, Line 59, in Equation (19), delete " $f_{n_H, n_{NH}}(y) = f_H^{*n_H} * f_{NH}^{*n_{NH}}(y - P_{CCH})$ " and insert -- $f_{n_H, n_{NH}}(y) = f_H^{*n_H} * f_{NH}^{*n_{NH}}(y - P_{CCH})$ --, therefor.

Signed and Sealed this
Twelfth Day of June, 2012

David J. Kappos
*Director of the United States Patent and Trademark Office*